Figure 1:
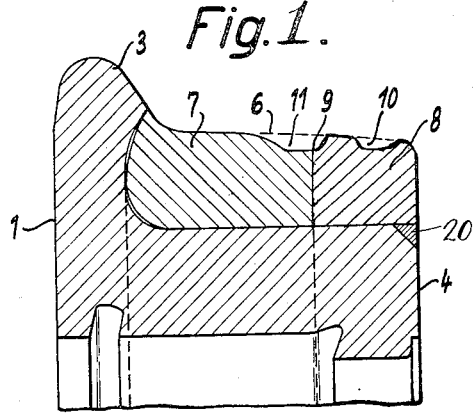

Feb. 11, 1936.　　　G. F. A. CORTS　　　2,030,243

WHEEL TIRE

Filed Dec. 5, 1933

Patented Feb. 11, 1936

2,030,243

UNITED STATES PATENT OFFICE 2,030,243

WHEEL TIRE

Gottfried F. A. Corts, Goteborg, Sweden

Application December 5, 1933, Serial No. 701,070
In Germany December 14, 1932

5 Claims. (Cl. 295—31)

My invention relates to the tires of wheels, more particularly for railway vehicles, and has for its object to make provision that the conical shape of the tread of the original tire cross section remains practically unaltered in service.

It has already been proposed for this purpose to provide annular grooves on the edge of the tire. My invention affords another way of solving this problem, by governing the regulation of the wear to the tire from the side of the material of the latter. The invention primarily provides that the tire is made from a material the resistance to wear of which, at least in the zone of the tread in, the vicinity of the flange, is higher than in the vicinity of the outer edge.

In the drawing are illustrated four embodiments of the idea of the invention, the Figures 1–4 representing cross sections of tires manufactured according to the invention.

In the several embodiments of the invention, the varying resistance to wear of the individual zones of the tire is obtained by the application of one or more rings made from material of the desired varying resistance (wear rings).

In the first embodiment, Figure 1, the tire 1 is made of a suitable material having a flange 3 and wearing zones formed by external rings 7 and 8 mounted on the tire. The rings 7 and 8 are made of such material that the portion of the tire adjacent the outer edge 4 of the tread 6, which is known to be subject to smaller wear, wears as quickly as the more highly stressed portion 7. Thus ring 7 consists of a material of high resistance while ring 8 is made from softer material. The two rings 7 and 8 touch each other by the joint 9 in a plane situated parallel to the flange 3.

The rings may be connected with one another and/or with the tire or wheel 1 by mechanical means or by shrinking or welding. Fig. 1 shows a ring of weld metal at 20 binding the wear ring 8 to the tire 1. Instead of two rings 7 and 8 more than two rings may be applied. In such a case again that ring must have the highest resistance to wear which is nearest to the flange 3, the resistance of the individual rings then decreasing toward the outer edge 4 of the tire 1, so that the ring situated on the outer edge 4 is the softest.

Figure 2:
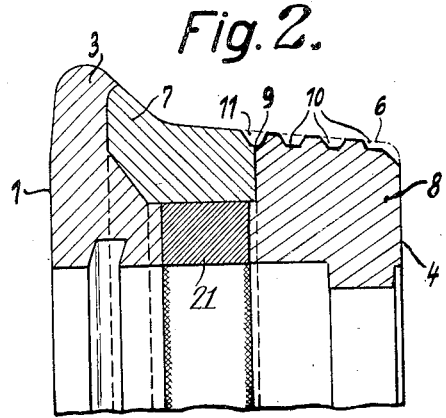

Fig. 2 shows another constructional form of invention, similar to Fig. 1, in which analogous parts are designated by the same reference characters. Here the wear ring 8 is bound to the tire 1 by a ring 21, which may be welded to the wear ring and tire.

The resistance to wear of the outer ring, for example ring 8 of Figure 2, may be decreased further by one or more annular grooves 10 being provided on the running surface which extend in parallel to the flange 3.

My invention further includes the important feature that the joint 9 existing between the rings 7 and 8 enlarges toward the tread 6 of the tire 1 so as to form an annular groove 11. I obtain by this enlargement that the joint 9 is not opened by the rail pressure, owing to the material giving way laterally.

Figure 3:
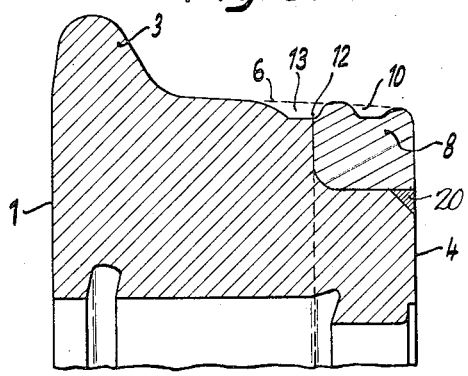
Figure 4:
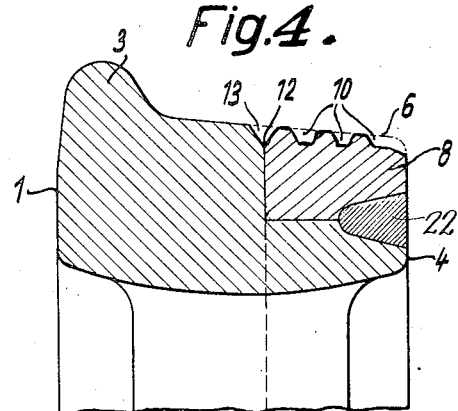

Figures 3 and 4 show embodiments corresponding to those illustrated in Figures 1 and 2, with the difference that only on the outer edge 4 a ring 8 of softer material is applied to the tire 1 which again is made of material of higher resistance to wear. A ring 20, or 22, of weld metal secures the wear ring 8 to the tire 1. The surface of ring 8 is likewise provided with one or more annular grooves 10 and the joint 12 existing between ring 8 and tire 1 is likewise enlarged toward the tread 6 so as to form an annular groove 13.

I wish to state, that it is immaterial for my invention, whether the tire is made in one piece with the wheel body, as in Fig. 4, or forms a separate piece, as shown in the other figures.

What I claim and desire to secure by Letters Patent is:—

1. A wheel tire composed of a tire body and external rings applied thereto and consisting of material of different resistance to wear, the ring of highest resistance being situated adjacent to the flange and that of smallest resistance on the outer edge of the tire.

2. A wheel tire composed of a tire body and an external ring applied thereto on the outer edge of said tire, the material of said tire body having higher resistance to wear than that of said ring.

3. A wheel tire composed of a tire body and external rings applied thereto and consisting of material of different resistance to wear, the ring of highest resistance being situated adjacent to the flange and that of smallest resistance on the outer edge of the tire, the joint existing between said rings being enlarged on its outer end toward the tread of the tire body, so as to form an annular groove.

4. A wheel tire composed of a tire body and an external ring applied thereto on the outer edge of said tire, the material of said tire body having higher resistance to wear than that of said ring, the joint existing between said tire body and said ring being enlarged on its outer end toward the tread of the tire so as to form an annular groove.

5. A wheel tire having a hard wearing surface adjacent the flange of the tire and at least one external ring of lower wear resistance on the outer edge of the tire.

GOTTFRIED F. A. CORTS.